United States Patent [19]

Tsukagoshi

[11] Patent Number: 5,426,531
[45] Date of Patent: Jun. 20, 1995

[54] TRANSMISSION SCREEN

[75] Inventor: Kazuo Tsukagoshi, Nagaokakyo, Japan

[73] Assignee: Mitsubishi Denki Kabushiki Kaisha, Kyoto, Japan

[21] Appl. No.: 164,945

[22] Filed: Dec. 10, 1993

[30] Foreign Application Priority Data

Dec. 14, 1992 [JP] Japan .................................. 4-332767

[51] Int. Cl.$^6$ ............................................. G03B 21/60
[52] U.S. Cl. ....................................... 359/457; 359/460
[58] Field of Search ............... 359/455, 454, 456, 457, 359/460

[56] References Cited

U.S. PATENT DOCUMENTS

| Re. 33,795 | 1/1992 | Ogino | 353/74 |
|---|---|---|---|
| 4,432,010 | 2/1984 | Oguino | 358/60 |
| 4,509,823 | 4/1985 | Moriguchi et al. | 350/128 |
| 4,636,035 | 1/1987 | Clausen et al. | 350/128 |
| 4,752,116 | 6/1988 | Sekiguchi | 350/128 |
| 4,859,027 | 8/1989 | Kishida | 350/128 |
| 4,919,515 | 4/1990 | Hasegawa et al. | 350/128 |
| 4,993,806 | 2/1991 | Clausen et al. | 350/128 |
| 5,020,877 | 6/1991 | Yokoo et al. | 350/128 |
| 5,064,273 | 11/1991 | Lee | 359/457 |
| 5,066,099 | 11/1991 | Yoshida et al. | 359/457 |
| 5,071,224 | 12/1991 | Yokoo | 359/456 |
| 5,184,224 | 2/1993 | Mitani et al. | 358/231 |
| 5,191,472 | 3/1993 | Kurematsu et al. | 359/619 |
| 5,206,761 | 4/1993 | Ogino | 359/457 |
| 5,289,311 | 2/1994 | McClelland et al. | 359/457 |
| 5,296,922 | 3/1994 | Mitani et al. | 348/779 |

FOREIGN PATENT DOCUMENTS

| 58-57121 | 4/1983 | Japan . |
|---|---|---|
| 63-187140 | 11/1988 | Japan . |
| 3220542 | 9/1991 | Japan . |

Primary Examiner—Richard A. Wintercorn

[57] ABSTRACT

A transmission screen includes a screen material having a projection light incident surface on which a Fresnel lens is formed, and a projection light outside surface on which a lenticular lens is formed. The lenticular lens has a plurality of lenticular lens portions. Formed between adjacent pairs of the lenticular lens portions are black stripes. Images of the projection light are seen on an outer surface of the lenticular lens. Furthermore, a coating having a low refraction index and a predetermined thickness is formed only on the black stripes.

9 Claims, 2 Drawing Sheets

TRANSMISSION SCREEN

BACKGROUND OF THE INVENTION

The present invention relates to a transmission screen used for example in a projection television set and a slide projector. The invention also relates to a method of making such a transmission screen.

A conventional transmission screen disclosed in for example Japanese Patent Kokai Publication No. H3-220542 is shown in FIG. 5. As illustrated, it comprises a semitransparent lenticular lens anti a transparent Fresnel lens 2 on the rear side of the lenticular lens 1. The lenticular lens 1 is the formed of a screen material such as acrylic resin in which light scattering material such as glass powder is mixed. The Fresnel lens 2 is formed of acrylic resin or the like. Provided on the front and rear sides of the lenticular lens 1 are arrays of semi-cylindrical lenses forming lenticular surfaces 1a and 1b. Provided in front of the lenticular lens 1 are black stripes 3 made up of a light absorbing material and formed by printing, to cover the areas other than the areas through which light is to be transmitted. The black stripes 3 are provided to absorb light incident from the outside, e.g., room illuminating light. If the black stripes 3 were not provided, the external light incident on the lenticular lens 1 would be scattered by the light scattering material in the lenticular lens 1. This would increase the brightness throughout the screen, and the contrast of the image as seen from the front side (the right side in FIG. 5) would be lowered. A transparent coating (thin film) 4 of a fluorine resin compound is formed on the front surface of the lenticular lens 1 and the rear surface of the Fresnel lens 2. The transparent coating has a low refraction index, and lowers the reflection of projection light and external light incident on the lenticular lens 1 and the Fresnel lens 2 which are formed of an acrylic resin as a basic component. In this way, the transparent coating 4 increases the contrast of the image on the screen.

The light absorbing layer in the form of black stripes are formed by printing. Such printing is conducted after the molding of the lenses. Thus, complicated steps are involved in such printing. Moreover, visual alignment (alignment by observation with human eyes) is difficult.

It was proposed, as disclosed in Japanese Patent Kokai Publication No. S58-57121, to provide an ink application roller having a number of larger diameter portions (annular projections) juxtaposed with each other and provided at positions confronting the projecting parts of the lenticular die. An ink is coated or applied, by means of a roller, to the peripheral surfaces of the larger diameter portions of the application roller. The ink contains a light absorbing material, and also contains as the binder which can be thermally laminated with the screen material. When the lenticular lens is molded, the ink on the peripheral surfaces of the larger diameter portions is thermally laminated with the front surface of the non-transmissive parts of the lenticular lens, between the lenticular die roller and the ink application roller.

Providing transparent coatings having a low refraction index, on the front and rear surfaces of the lenticular lens or the Fresnel lens, as described in connection with the prior art example of FIG. 5, is effective for increasing the contrast of the image. However, when a transparent coating is formed over the entire lens surface, a large amount of the material is required, and a long time is needed for forming the coating. Thus, it imposes limitations to the productivity and the cost. A method for forming the transparent coating in a short time is to use the ink application roller having juxtaposed larger diameter portions as disclosed in the above-mentioned Japanese Patent Kokai Publication No. S58-57121. This method is effective when the stripes are formed on a flat surface, but is not applicable to a situation where a coating is to be formed over the entire lenticular surface.

SUMMARY OF THE INVENTION

An object of the invention is to improve the contrast of the image on the screen, by suppressing the reflection at the surface of the lenticular lens while preventing a reduction in productivity and an increase in cost.

According to one aspect of the invention, there is provided a transmission screen comprising:
- a screen material having a projection light incident surface on which a Fresnel lens is formed, and a projection light outside surface on which a lenticular lens and black stripes are formed, image of the projection light being seen on the outside surface, wherein a coating of a low refraction index of a predetermined thickness is formed on the outside surface of the screen material, only on the black stripes.

According to the transmission screen of the invention, the coating of a low refraction index is formed only on the black stripes of the outside surface of the lenticular lens. When the thickness of the coating is appropriately adjusted, the absorption at the black stripes is increased, and the reflection of the external light is reduced, so that the contrast of the image on the screen is improved.

According to another aspect of the invention, there is provided a method of making a transmission screen, comprising the steps of:
- preparing a screen material having black stripes provided on the outside surface of the lenticular lens;
- passing the screen material between an application roller and a pressing roller;
- applying a solution of a material of a coating with a low refraction index onto the application roller;
- whereby a coating of a predetermined thickness having a low refraction index is applied on said black stripes.

According to the method of the invention, a screen material is passed between the application roller and the pressing roller, and a solution of a coating material is applied to the protecting parts of the outside surface of the lenticular lens where the black stripes are to be formed. Thus, a coating is formed only on the selected parts of the surface in a short time, and the amount of the coating material can be reduced.

DETAILED DESCRIPTION OF THE PREFERRED EMBODIMENTS

Figure 1:
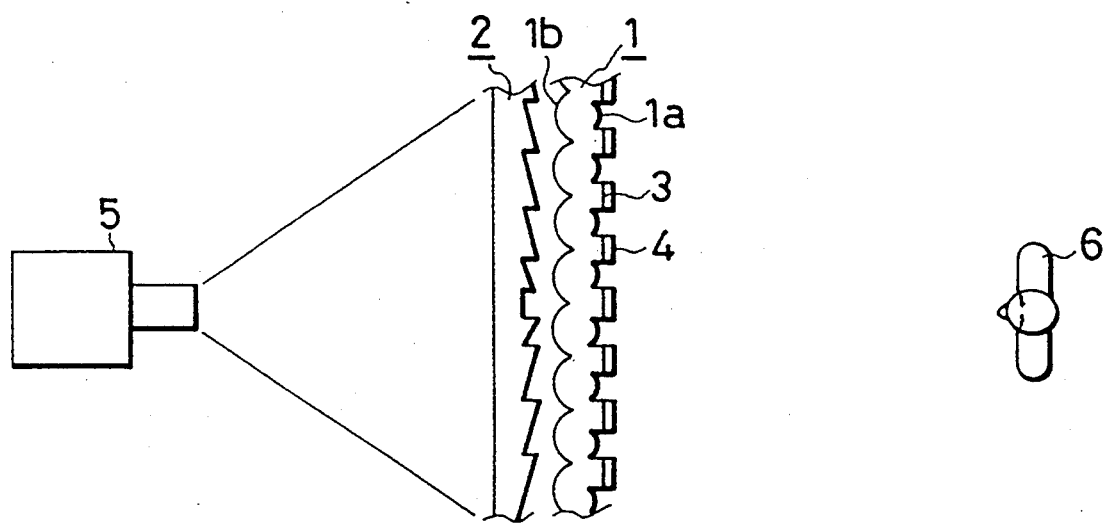
FIG. 1 is a diagram showing a transmission screen of an embodiment of the invention incorporated in a rear projection television set.

FIG. 1 shows a transmission screen of an embodiment of the invention, which is incorporated in a rear projection television set. The illustrated transmission screen comprises a semi-transparent lenticular lens 1 formed of a screen material such as an acrylic resin in which light scattering material such as glass powder is mixed. Provided on the rear surface of the lenticular lens 1 is a transparent Fresnel lens 2 formed of a screen material such as an acrylic resin. The combination of the lenticular lens 1 and the Fresnel lens 2 form a two-piece transmission screen (transmission screen consisting of two members). The lenticular lens 1 has lenticular surfaces 1a and 1b which comprise an array of cylindrical lenses formed of semi-cylindrical surfaces on the lenticular surfaces 1a and 1b, and forming lens portions, each extending in a first direction, e.g., the vertical direction (the direction normal to the page in FIG. 1), and juxtaposed with each other in a second direction perpendicular to the above-mentioned first direction, e.g., the horizontal direction (up-down direction in FIG. 1). Provided on the front side of the lenticular lens 1 are black stripes 3 extending in the vertical direction and juxtaposed in the horizontal direction. The black stripes 3 are formed on the projecting parts between the lenticular portions on the front side of the lenticular lens, except on the areas where the light is to be transmitted. The black stripes 3 absorb the incident external light to prevent degradation of the contrast of the image due to scattering of the incident external light. The black stripes 3 are formed by printing or the like.

On the front surface (outside surface, or an exit surface) of the lenticular lens 1 is a transparent coating 4 formed of a low refraction index material such as a fluorine resin compound. The coating 4 is provided only on the black stripes 3.

The transmission screen configured as described above receives, on its rear side, a projection light (image light) from the projector 5. The Fresnel lens 2 is provided to receive the image light and the lenticular lens 1 is provided on the outside surface, to permit a viewer 6 to see the image on the front side of the screen.

In the embodiment described above, the projection light is converted, by the Fresnel lens 2, into a parallel image light, with a certain suitable degree of scattering. The image light is then scattered to a much larger degree in the horizontal direction by the lenticular surfaces 1a and 1b of the lenticular lens 1.

Figure 4:
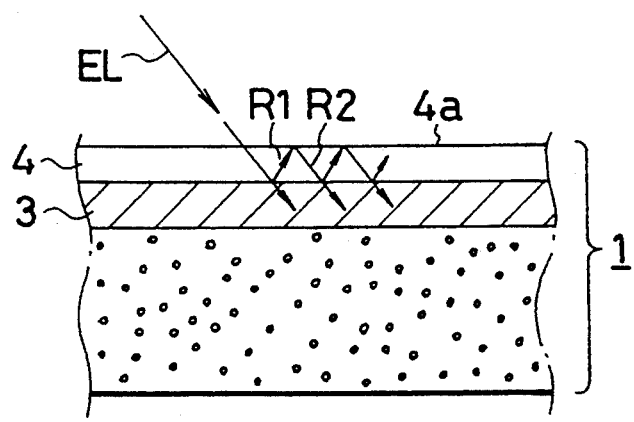
FIG. 4 is a diagram showing the function of the transparent coating.
Figure 5:
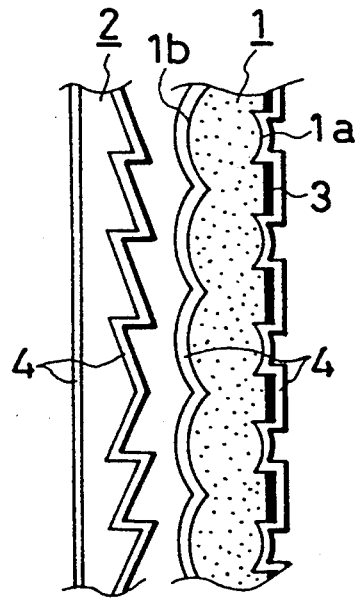
FIG. 5 is a sectional view showing a conventional transmission screen.

The external light EL shown in FIG. 4, from the room illumination for example, incident on the transparent coating 4 passes through the transparent coating 4, and is mostly absorbed by the black stripes 3. Such absorption reduces the scattering and reflection of the incident external light, to thereby improve the contrast of the image as seen on the front surface of the screen.

Part of the external light EL incident on the black stripes 3 is reflected. But such reflected light R1 is again reflected at the outer surface 4a of the coating 4, and is directed to the black stripes 3 again, as indicated by R2. Most of such re-reflected light is absorbed by the black stripes. Such a process is repeated, so that the proportion of the light absorbed to the incident light is increased.

Increased absorption of the external light further improves the contrast of the image.

Figure 2A:
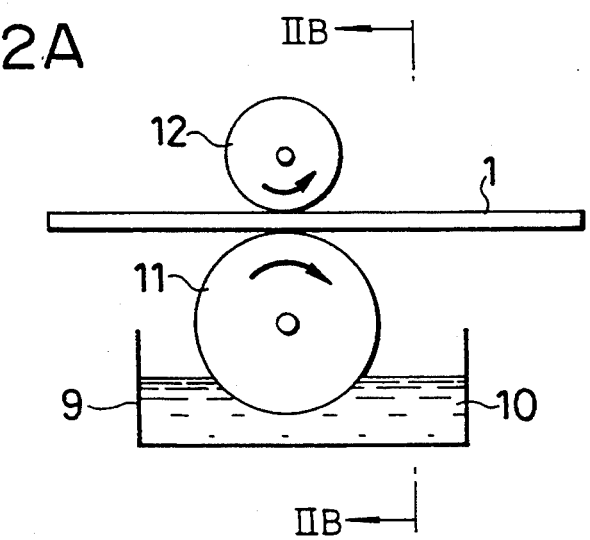
FIG. 2A is a side view showing coating or application of a transparent coating onto the screen material.
Figure 2B:
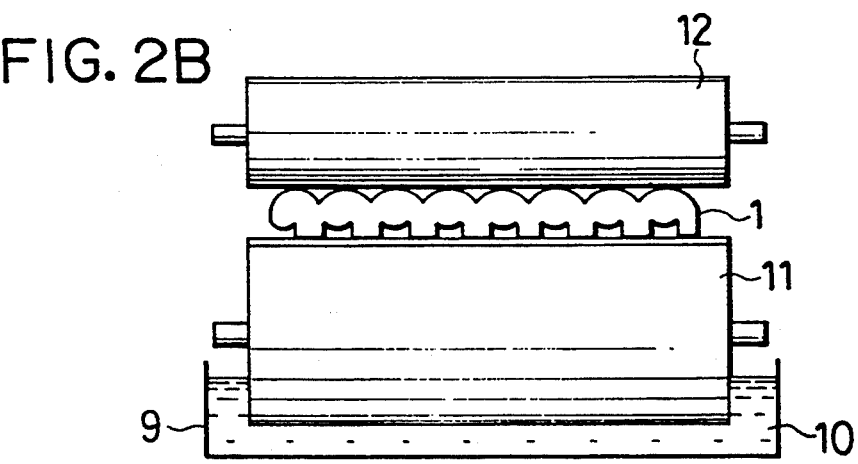
FIG. 2B is a sectional view along line IIB—IIB in FIG. 2A.

FIG. 2A shows the process of coating or applying the transparent coating in the method of the transmission screen formation according to the invention. As illustrated in FIG. 2A and FIG. 2B, a transparent coating material solution 10 is contained in a bath or fountain 9. The solution contains a material of the coating 4 to be formed on the black stripes 3 dissolved in a solvent at a predetermined concentration. An application roller 11 is partially immersed and rotated for applying the solution 10 onto the surfaces of the black stripes 3 on the lenticular lens 1. A pressing roller 12 is provided to confront the application roller 11, with the lenticular lens 1 between them. That is, the lenticular lens 1 is inserted between the pressing roller 12 and the application roller 11.

Figure 3A:
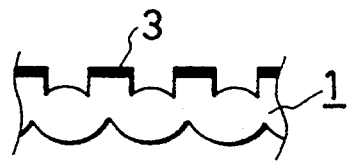
FIG. 3A and FIG. 3B are diagrams of the screen material before and after the application of the transparent coating on the black stripes.
Figure 3B:
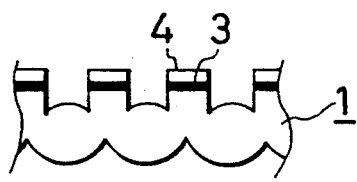

The lenticular lens 1 is formed to have the lenticular surfaces and is provided with black stripes at the projecting portions, as illustrated in FIG. 3A in advance, i.e., it is subjected to the process of application of the transparent coating 4. The lenticular lens 1 is inserted between the pressing roller 12 and the application roller 11 such that the surface provided with the black stripes is brought into contact with the application roller 11. The transparent coating solution 1 is applied onto the outer surfaces of the black stripes which are projecting relative to other parts of the front side of the lenticular lens 1. The pressing roller 12 and the application roller 11 are rotated while the lenticular lens 1 is passed between them. As a result, the coating of a predetermined thickness is formed on the black stripes as illustrated in FIG. 3B.

In the embodiment described above, the transmission screen consists of two pieces (a lenticular lens and a Fresnel lens 2). The invention is however applicable to a transmission screen consisting of three or more pieces (one Fresnel lens and two lenticular lenses), and to a transmission screen consisting of a single piece having a lenticular lens formed on its front surface and a Fresnel lens formed on its rear surface.

As has been described, according to the invention, a coating is formed only on black stripes on the outside surface of the lenticular lens. The amount of coating material is therefore substantially reduced, while the contrast of the image is improved. The transparent coating is formed only on the black stripes by coating utilizing the fact that the black stripes are on projecting portions between lenticular portions. The coating of a predetermined thickness is formed quickly, and in a manner suitable for mass production.

What is claimed is:

1. A transmission screen comprising:
   a screen material having a projection light incident surface on which a Fresnel lens is formed, and a projection light outside surface on which a lenticular lens, having a plurality of lenticular lens portions, is formed, black stripes formed on said lenticular lens between adjacent pairs of lenticular lens portions, image of said projection light being seen on said projection light outside surface, wherein a coating having a low refraction index and a predetermined thickness is formed on the outside surface of the screen material, only on said black stripes.

2. A transmission screen according to claim 1, wherein said lenticular lens has an array of semi-cylindrical surfaces extending in a first direction and juxtaposed in a second direction perpendicular to said first direction and said semi-cylindrical surfaces form said lenticular lens portions.

3. A transmission screen according to claim 1, wherein said black stripes are formed on projecting parts of said projection light outside surface between adjacent lenticular lens portions.

4. A transmission screen comprising:
a first lens on which projection light is incident;
a lenticular lens having a plurality of lenticular lens portions, said lenticular lens receiving said projection light via said first lens;
black stripes formed on an outer surface of said lenticular lens between adjacent lenticular lens portions; and
a coating formed only on each black stripe.

5. A transmission screen according to claim 4, wherein said first lens is a Fresnel lens.

6. A transmission screen according to claim 4, wherein
said first lens has an outer and inner surface, and said projection light being incident on said outer surface of said first lens; and
said lenticular lens having an inner and outer surface, and said lenticular lens disposed so that said inner surface of said lenticular lens faces said inner surface of said first lens.

7. A transmission screen according to claim 4, wherein
said lenticular lens has projection portions formed on said outer surface of said lenticular lens between adjacent lenticular lens portions; and
said black stripes are formed on said projection portions.

8. A transmission screen according to claim 4, wherein said lenticular lens portions form an array of semi-cylindrical surfaces extending in a first direction and juxtaposed in a second direction perpendicular to said first direction.

9. A transmission screen according to claim 4, wherein said coating has a low refractive index and a predetermined thickness.

* * * * *